March 6, 1956  F. H. WRIGHT, JR  2,737,443
PROCESS FOR THE PRODUCTION OF STABILIZED
SODIUM ACID PYROPHOSPHATE
Filed June 17, 1952
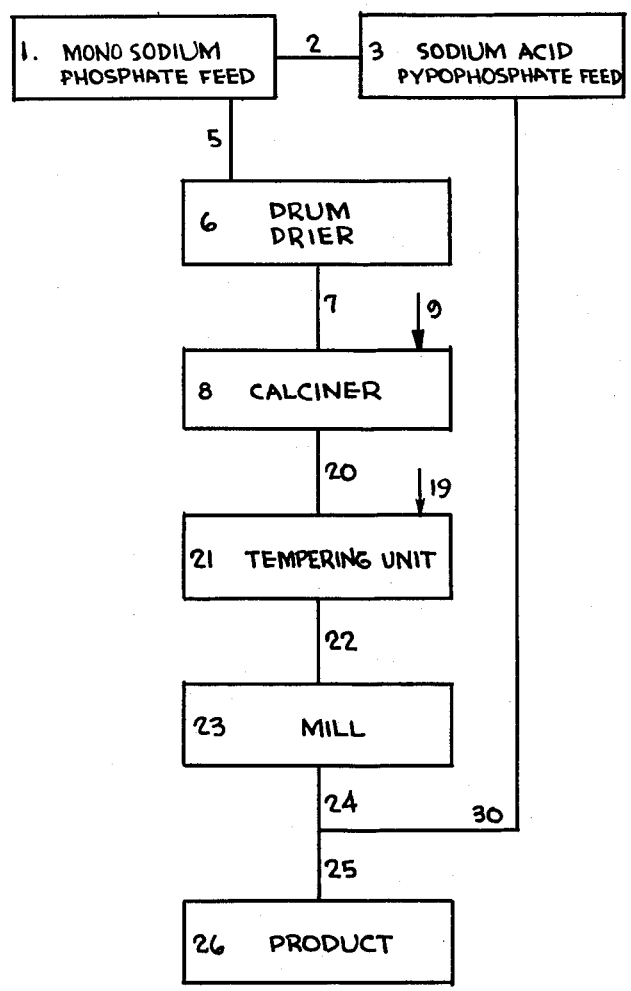
INVENTOR.
FELIX H. WRIGHT, JR.
BY
Herman O. Bauermeister
Attorney & 2,737,443
Patented Mar. 6, 1956

2,737,443

PROCESS FOR THE PRODUCTION OF STABILIZED SODIUM ACID PYROPHOSPHATE

Felix H. Wright, Jr., Dayton, Ohio, assignor to Monsanto Chemical Company, St. Louis, Mo., a corporation of Delaware Application June 17, 1952, Serial No. 294,041

3 Claims. (Cl. 23—106)

The present invention relates to a fast-reacting sodium acid pyrophosphate having greatly improved turbidity characteristics and to a novel method of producing the same.

The principal object of the invention is to provide sodium acid pyrophosphate having a combination of properties which render it eminently suitable for use in the production of doughnuts.

Another object is to provide sodium acid pyrophosphate having a reaction rate of 29 to 35 and preferably 31 to 33, inclusive.

A further object is to provide sodium acid pyrophosphate having a reaction rate within the above range and having a controlled stability such that dough reaction rate thereof increases to the range of 34 to 40 and preferably 36 to 38 when the above product is subjected to an atmosphere containing 75% relative humidity at a temperature of 30° C. for a period of seven days.

A still further object is to provide a novel method of producing sodium acid pyrophosphate having the above desirable properties.

Other objects and advantages will become apparent to those skilled in the art as the description proceeds.

A disadvantage of the prior art forms of sodium acid pyrophosphate suitable for doughnut baking is that such compositions which have been available show considerable turbidity or cloudiness in aqueous solution. This is a deterring factor in the use of such compounds in the baking of doughnuts, since it is obviously desirable to have a sodium acid pyrophosphate which dissolves in water to yield a clear aqueous solution. It has now been found that the preparation of sodium acid pyrophosphate of greatly reduced turbidity and in a form of particular utility for the baking of doughnuts may be accomplished by the crystallization of the monosodium phosphate salt from a slurry or solution prepared from monosodium phosphate. When a solution is referred to herein, the term also includes slurries. The present sodium phosphate solution contains about 0.10% to about 0.20% of $K_2O$ and about 0.025% to about 0.075% $Al_2O_3$, calculated on the basis of equivalent $NaH_2PO_4$. In the preparation of the said slurry or solution, various sodium phosphates, phosphoric acids, and sodium carbonates or hydroxide may be mixed to provide a slurry or solution corresponding stoichiometrically to the formation of monosodium phosphate. It is essential, furthermore, to add to such solution of monosodium phosphate a minor proportion, for example, from 1 to 12.5% by weight of previously-formed sodium acid pyrophosphate, a preferred proportion being from 3% to 6% by weight referred to the $NaH_2PO_4$. Such sodium acid pyrophosphate may be the chemically pure form of such compound or may be a recycle of a portion of the sodium acid pyrophosphate as prepared in accordance with the present process. The above solution or slurry is crystallized to a mixture of phosphate salts by thermally evaporating such as by means of a drum drier to obtain the product in anhydrous form. These salts are then calcined to produce sodium acid pyrophosphate, such as by heating to a temperature of 225° C. to 235° C. The calcination is carried out either with or without steam being added to the calciner. Thereafter the sodium acid pyrophosphate is tempered so as to partially stabilize the same. The tempering of the sodium acid pyrophosphate is carried out by passing the mixture into a rotating drum wherein the temperature is maintained at 215° C. to 245° C. while in an atmosphere containing a partial pressure of water corresponding to 230 mm. to 760 mm. Hg, said operation being preferably carried out at 305 mm. to 380 mm., and being carried out for about one hour to about four hours with the atmosphere therein being maintained at atmospheric pressure. It has been found that this latter process step of tempering or controlling of the water relationship in the molecular structure of the final compound is essential. This provides the optimum dough reaction rate and stability for the production of doughnuts. After the above treatment, the product is ground and sized for commercial use.

The tempering treatment is carried out for a period of about one to four hours, a preferred time being two hours, although it is obvious that the use of a higher humidity enables the process to be carried out at the shorter time periods within the above ranges. In general, the higher the proportion of water vapor present in the tempering step, the shorter is the time required to yield a product having a given reaction rate within the limits of about 29 to 35 and vice versa.

The tempered product is milled to a fineness permitting at least 75% by weight of the material to pass through a 325 mesh screen. More particularly the product is ground to meet the following specifications:

Screen size (U. S. Standard sieves)

| | |
|---|---|
| Cumulative retained 80 | 0–0.1 |
| Cumulative retained 100 | 0–0.5 |
| Cumulative retained 125 | 10–25.0 |

The present process employing the addition of previously prepared sodium acid pyrophosphate and tempering results in the formation of a product having greatly improved turbidity characteristics. For example, conventional sodium acid pyrophosphate as sold for doughnut production has a turbidity rating (American Public Health Association method) of about 180 to 400. In contrast thereto the product of the present invention made with the addition of .5% previously-formed sodium acid pyrophosphate and using the tempering step results in a product having an American Public Health Association turbidity rating of 45.

The preparation of uniform doughnuts of good color and texture, with low grease-soaking properties, regular flutes and well-rounded walls requires sodium acid pyrophosphate with a special combination of properties.

For example, if the leavening acid employed has a reaction rate which is too slow, i. e., below 29, doughnuts prepared in a doughnut-making machine from doughnut mixes containing same are deformed and have a cracked surface which impairs their appearance. Moreover, the cracked surfaces of the doughnuts permit excessive grease absorption which has a deleterious effect on their palatability, as well as an added expense to the baker due to excessive use of expensive fat. On the other hand, if the reaction rate of the sodium acid pyrophosphate is too fast, i. e., above 35 for the freshly prepared product, the doughnuts made in the machine are deformed, flat and spongy in character and also demonstrate cracked surfaces with the result that they absorb excessive quantities of grease which substantially impairs their appearance and palatability, and results in greater production costs.

While a fast reaction rate is an essential property of a satisfactory leavening acid for baking doughnuts, it is not the only factor which determines the utility of sodium acid pyrophosphate for the above purpose. For example, a sodium acid pyrophosphate may have a reaction rate within the range of 29 to 35 and still not yield satisfactory doughnuts; in order to perform this function satisfactorily and at the same time possess the desired degree of stability to change in reaction rate, it must contain the aluminum and alkali metal oxide impurities disclosed in Patent No. 2,408,258 to Eugene N. Hetzel et al, and be treated in the manner hereinafter described.

In accordance with the present invention a method of treating sodium acid pyrophosphate has been developed whereby a partially stabilized, fast-reacting product is obtained which is eminently suitable for use in the baking of doughnuts.

The invention will be further illustrated by the following specific examples. However, it should be understood that these examples are given primarily for purposes of illustration and the invention in its broader aspects is not limited thereto.

*Example 1.*—A solution containing 148.5 pounds of monosodium phosphate in 100 pounds of water was prepared. To this solution was added 0.24 pounds of $NaAlO_2$ and 0.25 pounds of KOH, and 7.4 pounds of sodium acid pyrophosphate to obtain a slurry. The slurry was thermally evaporated to dryness on a drum dryer to give the anhydrous form of monosodium orthophosphate containin minor proportions of added components as described above. The dry salts were then calcined in a cylindrical vessel maintained at a temperature of about 225° C. to about 235° C. The calcination operation produced sodium acid pyrophosphate. In order to temper this crude material to provide a satisfactory product for use in doughnut baking, the above sodium acid pyrophosphate was heated at 225° C. in a rotating cylindrical drum having an open end for the feed and having a discharge spout at the other end arranged with a slight inclination of the longitudinal axis of the drum so that rotation of the said drum caused the product to pass progressively down the length of the drum. Provision was also made for the introduction of steam so as to provide a partial water vapor pressure of about 350 mm. of mercury in the atmosphere of the drum. The charge of calcined sodium acid pyrophosphate was fed to the above apparatus at a rate such that the sojourn time of the material being tempered in the above unit was about two hours.

After the tempering treatment the sample was discharged from the apparatus, whereupon it was milled to the desired particle size. The dough reaction rate for the product produced in the above manner was 32.0 and the rate for this sample after humidification was 37.4.

*Example II.*—In order to show the importance of the step of addition of previously-formed sodium acid pyrophosphate, as described above, a test similar to Example I was made without the addition of the pyrophosphate. The test data on the dough reactivity of this product is shown below, together with that of the other examples.

*Example III.*—The procedure of Example I was repeated using a partial pressure of water vapor of about 305 mm. and a sojourn time of about two hours. The dough reaction rate for this product was 31.2.

The products of Example I and III were evaluated from the standpoint of the doughnut leavening properties. These products were found to be markedly superior to conventional stabilized sodium acid pyrophosphate, or to material produced according to this process but without sodium acid pyrophosphate recycle. For example, when a typical untreated sample of conventional sodium acid pyrophosphate and the products of Examples I, II and III were used with a commercially prepared doughnut mix in the baking of doughnuts the following results were obtained:

| Sodium Acid Pyrophosphate | Dough Reaction Rate | | Baking Score |
|---|---|---|---|
| | Fresh Product | Humidified Product | |
| Sample according to U. S. 2,408,258 | 25.8 | 27.0 | 56.7 |
| Sample of Example I | 32.0 | 37.4 | 80.3 |
| Sample of Example II | 28.9 | 33.0 | 64.3 |
| Sample of Example III | 31.2 | 36.9 | 75.0 |
| Sample of Example IV | 28.2 | 32.0 | 66.8 |

*Example IV.*—Sodium acid pyrophosphate was prepared as in Example I by crystallization employing 5% of previously prepared sodium acid pyrophosphate. This material was calcined at 235° C. and was held at 235° C. for two hours, but was not subjected to the steam treatment described above. The product when tested showed an inferior dough reaction rate and baking score as shown above.

A doughnut having a total score of at least 60 is deemed satisfactory. Therefore, it is evident from the above data that the sodium acid pyrophosphate recycle to the monosodium phosphate feed plus the tempering treatment described above in comparison with conventional sodium acid pyrophosphate yields a product which is greatly superior for use in baking doughnuts. The initial reaction rate of the product described in the Hetzel et al. patent described above varies within the range of about 25 to 30, depending upon its content of alkali metal oxide and $Al_2O_3$ impurities. Therefore, the hereinbefore-described operating conditions will vary to some extent with the desired reaction rate of the product obtained as a stabilized sodium acid pyrophosphate.

In arriving at the above baking scores, the appearance of the up side and down side of the doughnuts is taken into consideration. The former is considered the more important of the two and is given a total rating of 65, whereas the latter is assigned a total rating of 35. The above total ratings are broken down as follows:

*Up side of doughnut*

| | |
|---|---|
| Dishing | 30 |
| Breaks | 10 |
| Color | 5 |
| Surface texture | 20 |
| Total | 65 |

*Down side of doughnut*

| | |
|---|---|
| Flutes | 20 |
| Breaks | 10 |
| Blisters | 5 |
| Total | 35 |

The above method, although qualitative in nature, constitutes a very convenient and practical means of evaluating the effectiveness of a given leavening acid in the baking of doughnuts and the results obtained by those skilled in the art in applying this test agree quite closely.

The products of the instant invention are admirably suitable for use in the baking of dougnuts, giving a baking score of 60 to 90. Moreover, they are characterized by a controlled change in reaction rate on storage. For example, a product with an original dough reaction rate of 32.0 will increase in dough reaction rate to about 37.0, when subjected to 75% relative humidity and a temperature of 30° C. for a period of seven days. No difference in baking score can be discerned between doughnuts baked with the original tempered product or those baked with the product after exposure to a humid atmosphere even though these products vary widely in dough reaction rate. This is important since in practice the above products are not always used immediately after they are prepared, but are sometimes stored as such or in dry doughnut mixes for several months prior to use.

The dough reaction rate as used in the present specification is the amount of carbon dioxide evolved from moist dough leavened with sodium acid pyrophosphate during the first eight minutes at a temperature of 27° C. For example, if the above compound in a leavening composition containing sodium bicarbonate liberates at 27° C. about 32% of the contained carbon dioxide over a period of eight minutes it exhibits a reaction rate of 32. For a more detailed discussion of dough reaction rate, reference is made to "Cereal Chemistry," vol. 8, page 423, of 1931.

For a more complete understanding of the present invention, reference is made to the accompanying drawing which illustrates the flow sheet of a typical method of practicing the instant invention. In the drawing, vessel 1 is provided with a supply of monosodium phosphate solution, which solution also contains 0.10% to 0.20% by weight of $K_2O$, together with 0.025% to 0.075% $Al_2O_3$ based upon the solids in the slurry. A pipe 2 is also provided in vessel 1 so that sodium acid pyrophosphate may be added to the monosodium phosphate in minor proportions. A preferred embodiment is the use of from 1% to 12.5% of sodium acid pyrophosphate based upon the solids in the slurry in vessel 1. The slurry from vessel 1 is withdrawn by line 5 to drum dryer 6. In this piece of equipment the solution or slurry of monosodium phosphate containing the above-described impurities is thermally evaporated to yield anhydrous monosodium phosphate containing the above impurities. From drum dryer 6 the dry salts are transferred by line 7 to calciner 8, which is provided with heating means and optionally may have a supply of water vapor such as steam entering by means of line 9. The calciner is operated at a temperature of about 225° C. to about 235° C. If steam is employed, it is used at a partial pressure of about 100 mm. to about 140 mm. Hg. In calciner 8 the monosodium phosphate is transformed to sodium acid pyrophosphate containing the potassium and aluminum salts as impurities, as described above. The product from the calciner is transferred by line 20 to tempering unit 21. This is an open vessel such as a rotating cylinder in which the longitudinal axis is slightly inclined so that the sodium acid pyrophosphate fed in at one end slowly traverses the length of the tempering unit. In the tempering unit 21 the temperature is maintained in the range of 215° C. to 245° C. Provision is also made for the introduction of steam by line 19 to supply water vapor at a partial pressure of 230 mm. to 760 mm. of mercury. The tempering unit 21 is operated at atmospheric pressure, since it is open to the atmosphere. The sodium acid pyrophosphate passing through the tempering unit during a period of from about one to about four hours is found to be a greatly improved product of controlled stability. The next step in the process is the withdrawal of the tempered material from tempering unit 21 by means of conduit 22, which feeds the material to a final grinding or milling operation in mill 23. From the milling unit 23 the ground and sized product may be passed directly to packaging by means of lines 24 and 25 to feed into receiver 26. However, a portion of the sodium acid pyrophosphate thus produced may be withdrawn through lines 24 and 30 to be fed to vessel 3 as a recycle feed of sodium acid pyrophosphate.

What is claimed is:

1. The process for the production of sodium acid pyrophosphate of low turbidity and having substantially improved doughnut baking properties which comprises thermally evaporating a monosodium orthophosphate solution containing from 1% to 12.5% by weight referred to $NaH_2PO_4$ of previously-formed sodium acid pyrophosphate together with about 0.10% to about 0.20% $K_2O$ and about 0.025% to about 0.075% $Al_2O_3$, basis $NaH_2PO_4$, to produce substantially dry monosodium orthophosphate, calcining the said monosodium orthophosphate at a temperature of about 225° C. to about 235° C. until sodium acid pyrophosphate has been formed, and thereafter tempering said pyrophosphate by maintaining it at atmospheric pressure and at a temperature of about 215° C. to 245° C. in an atmosphere containing 230 mm. to 760 mm. Hg partial pressure of steam, said operation being carried out for about one hour to about four hours, whereby the sodium acid pyrophosphate thus produced has low turbidity when dissolved in water.

2. The process for the production of sodium acid pyrophosphate of low turbidity and having substantially improved doughnut baking properties which comprises thermally evaporating a monosodium orthophosphate solution containing a minor proportion of previously-formed sodium acid pyrophosphate together with about 0.10% to about 0.20% $K_2O$ and about 0.025% to about 0.075% $Al_2O_3$, basis $NaH_2PO_4$ to produce substantially dry $NaH_2PO_4$, calcining the said $NaH_2PO_4$ in an atmosphere at a temperature of about 225° C. to about 235° C. until sodium acid pyrophosphate has been formed and thereafter tempering said pyrophosphate by maintaining it in an atmosphere containing water vapor at a partial pressure of about 230 mm. to 760 mm. of mercury at a temperature of about 215° C. to 245° C. at atmospheric pressure, said tempering being carried out for about one hour to about four hours, whereby the sodium acid pyrophosphate thus produced has low turbidity when dissolved in water, and thereafter separating the product and returning a portion of the said sodium acid pyrophosphate to the first-described solution of monosodium orthophosphate.

3. Stabilized sodium acid pyrophosphate of substantially improved doughnut baking properties and low turbidity produced by thermally evaporating a monosodium orthophosphate solution containing from 1.0% to 12.5% by weight referred to $NaH_2PO_4$ of previously-formed sodium acid pyrophosphate, together with about 0.10% to about 0.20% $K_2O$ and about 0.025% to about 0.075% $Al_2O_3$, basis $NaH_2PO_4$, to produce substantially dry monosodium orthophosphate, calcining the said monosodium orthophosphate at a temperature of about 225° C. to about 235° C. until sodium acid pyrophosphate has been formed and thereafter tempering said pyrophosphate by maintaining it at atmospheric pressure and at a temperature of about 215° C. to 245° C. in an atmosphere containing 230 mm. to 760 mm. Hg partial pressure of steam, said tempering being carried out for about one hour to about 4 hours.

References Cited in the file of this patent

UNITED STATES PATENTS

| | | |
|---|---|---|
| 2,408,258 | Hetzel | Sept. 24, 1946 |
| 2,630,372 | Wright | Mar. 3, 1953 |
| 2,636,808 | Hubbard et al. | Apr. 28, 1953 |